(12) United States Patent
Zhang et al.

(10) Patent No.: US 11,024,052 B2
(45) Date of Patent: Jun. 1, 2021

(54) STEREO CAMERA AND HEIGHT ACQUISITION METHOD THEREOF AND HEIGHT ACQUISITION SYSTEM

(71) Applicant: HANGZHOU HIKVISION DIGITAL TECHNOLOGY CO., LTD., Zhejiang (CN)

(72) Inventors: Di Zhang, Hangzhou (CN); Hui Gong, Hangzhou (CN); Ye Ren, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/548,721

(22) Filed: Aug. 22, 2019

(65) Prior Publication Data

US 2019/0378294 A1   Dec. 12, 2019

Related U.S. Application Data

(63) Continuation of application No. PCT/CN2018/076571, filed on Feb. 12, 2018.

(30) Foreign Application Priority Data

Feb. 23, 2017   (CN) .......................... 201710100940.1

(51) Int. Cl.
*G06T 7/70* (2017.01)
*G06T 7/80* (2017.01)
(Continued)

(52) U.S. Cl.
CPC ............... *G06T 7/70* (2017.01); *G06T 7/593* (2017.01); *G06T 7/80* (2017.01); *H04N 5/23203* (2013.01);
(Continued)

(58) Field of Classification Search
CPC .. G06T 7/70; G06T 7/593; G06T 7/80; G06T 2207/10012; G06T 2207/30244;
(Continued)

(56) References Cited

U.S. PATENT DOCUMENTS 9,304,194 B2 *   4/2016   Rhee ....................... G06T 7/246
2004/0252864 A1 *  12/2004   Chang ................ G06K 9/00805
                                                                382/104
(Continued)

FOREIGN PATENT DOCUMENTS

CN   101504287 A   8/2009
CN   103258322 A   8/2013
(Continued)

OTHER PUBLICATIONS

International search report and Written opinion in PCT application No. PCT/CN2018/076571 dated May 2, 2018.
(Continued)

*Primary Examiner* — Shawn S An
(74) *Attorney, Agent, or Firm* — Knobbe, Martens, Olson & Bear, LLP

(57) ABSTRACT

Disclosed are systems and methods for acquiring height of a stereo camera, applied to the stereo camera. An example method includes acquiring angle information of a stereo camera, with the angle information including a pitch angle and a tilt angle. A ground image of a scenario where the stereo camera is deployed is captured and depth information of each pixel on the ground image is determined. A three-dimensional point set based on depth information of each pixel on the ground image is established, with the three-dimensional point set including coordinate information of each three-dimensional point corresponding to each pixel of
(Continued)

the ground image. Height of the stereo camera is determined based on the angle information and the three-dimensional point set.

14 Claims, 9 Drawing Sheets

(51) Int. Cl.
    *G06T 7/593*       (2017.01)
    *H04N 13/204*     (2018.01)
    *H04N 5/232*      (2006.01)
    *H04N 13/00*      (2018.01)

(52) U.S. Cl.
    CPC . *H04N 13/204* (2018.05); *G06T 2207/10012* (2013.01); *G06T 2207/20032* (2013.01); *G06T 2207/20072* (2013.01); *G06T 2207/30244* (2013.01); *H04N 2013/0081* (2013.01)

(58) Field of Classification Search
    CPC .......... G06T 2207/20032; G06T 2207/20072; H04N 13/204; H04N 5/23202
    See application file for complete search history.

(56) References Cited

U.S. PATENT DOCUMENTS

| | | | | |
|---|---|---|---|---|
| 2004/0264763 | A1* | 12/2004 | Mas | G06K 9/00664 382/154 |
| 2005/0041842 | A1* | 2/2005 | Frakes | H04N 19/51 382/128 |
| 2007/0257910 | A1* | 11/2007 | Gutmann | G06K 9/00201 345/424 |
| 2012/0004792 | A1 | 1/2012 | Weber et al. | |
| 2012/0148100 | A1* | 6/2012 | Kotake | G06T 7/75 382/103 |
| 2016/0321789 | A1* | 11/2016 | Mercier | G06T 5/50 |
| 2017/0080338 | A1* | 3/2017 | Zalewski | A63F 13/213 |
| 2017/0308103 | A1 | 10/2017 | Li | |
| 2017/0323458 | A1* | 11/2017 | Lablans | G06K 9/00 |
| 2019/0236807 | A1* | 8/2019 | Zhang | G06T 7/85 |

FOREIGN PATENT DOCUMENTS

| | | |
|---|---|---|
| CN | 103854008 A | 6/2014 |
| CN | 105346706 A | 2/2016 |
| CN | 105469386 A | 4/2016 |
| EP | 2615580 A1 | 7/2013 |

OTHER PUBLICATIONS

First official action in Chinese application No. 201710100940.1 dated Apr. 17, 2019.

Extended European search report of counterpart EP application No. 18756576.7 dated Feb. 3, 2020.

\* cited by examiner

A reference plane equation corresponding to a reference plane is determined based on the pitch angle and the tilt angle, wherein the reference plane is parallel to a horizon plane in a world coordinate system, and a center point of a lens of the stereo camera is within the reference plane — 3051

Distances between each three-dimensional point in the three-dimensional point set and the reference plane are calculated to obtain a distance set — 3052

The height of the stereo camera is determined based on a maximum distance in the distance set — 3053

FIG. 3-3

STEREO CAMERA AND HEIGHT ACQUISITION METHOD THEREOF AND HEIGHT ACQUISITION SYSTEM

This application claims priority to, and is a continuation of, PCT/CN2018/076571, filed on Feb. 12, 2018, which claims the benefit of priority to Chinese Application No. 201710100940.1, filed on Feb. 23, 2017 and entitled "STEREO CAMERA AND HEIGHT ACQUISITION METHOD." Each of the above recited applications is hereby incorporated herein by reference in its entirety. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to the field of application of electronic technology, and particularly to a stereo camera, and height acquisition method and height acquisition system thereof.

BACKGROUND

Stereo cameras are cameras for reconstructing three-dimensional geometric information of a scenario. The stereo camera includes, but not limited to, a binocular stereo camera, a time of flight (TOF) stereo camera or the like which is capable of acquiring the three-dimensional information.

SUMMARY

Examples of the present disclosure provide a stereo camera, and a height acquisition method and system thereof.

According to a first aspect of the present disclosure, there is provided a method for acquiring a height of a stereo camera, applied to the stereo camera, the method comprising:

acquiring angle information of a stereo camera, wherein the angle information includes a pitch angle and a tilt angle;

capturing a ground image of a scenario where the stereo vision camera is deployed;

determining depth information of each pixel on the ground image;

establishing a three-dimensional point set based on the depth information of each pixel on the ground image, wherein the three-dimensional point set includes coordinate information of each three-dimensional point corresponding to each pixel of the ground image; and determining the height of the stereo camera based on the angle information and the three-dimensional point set.

Optionally, wherein the determining height of the stereo camera based on the angle information and the three-dimensional point set, comprises:

determining, based on the pitch angle and the tilt angle, a reference plane equation corresponding to a reference plane, wherein the reference plane is parallel to a horizon plane in a world coordinate system, and a center point of a lens of the stereo camera is within the reference plane;

calculating distances between each three-dimensional point in the three-dimensional point set and the reference plane to obtain a distance set; and determining the height of the stereo camera based on the distances in the distance set.

Optionally, wherein the determining, based on the pitch angle and the tilt angle, a reference plane equation corresponding to a reference plane, comprises:

determining the reference plane equation $ax+by+cz=0$ based on the pitch angle $\theta$ and the tilt angle $\varphi$, such that a point $(a, b, c)$ in a camera coordinate system meets an angle conversion equation:

$$[y] = [T^{-1}][x]; \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, and $(x_y, y_y, z_y)$ is a point in the world coordinate system corresponding to the point $(x_c, y_c, z_c)$ in the camera coordinate system, wherein an origin of the world coordinate system coincides with an origin of the camera coordinate system, and coordinate axes of the world coordinate system are correspondingly parallel to coordinate axes of the world coordinate system.

Optionally, wherein the calculating distances between each three-dimensional point in the three-dimensional point set and the reference plane to obtain a distance set, comprises:

calculating a distance $H_i$ between an $i^{th}$ three-dimensional point $(x_i, y_i, z_i)$ and the reference plane by using a first distance calculation equation based on the three-dimensional point set and the reference plane equation, wherein the distance set comprises the distance $H_i$, $1 \leq i \leq n$, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is $ax+by+cz=0$, a, b and c being coefficients of $ax+by+cz=0$.

Optionally, wherein the determining the height of the stereo camera based on the distances in the distance set, comprises:

combining the distances in the distance set to obtain a target distance set, wherein value of distances in the target distance set are different from each other, each distance has a number of times, and the times count value indicates a times count of occurrences of a corresponding distance in the distance set; and determining a distance corresponding a maximum number of times in the target distance set as the height of the stereo camera.

Optionally, wherein the reference plane equation is $ax+by+cz=0$, a, b and c being coefficients of $ax+by+cz=0$; and wherein the determining the height of the stereo camera based on the distances in the distance set, comprises:

forming, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;

determining a middle point of width in the horizontal axis of a rectangular column having a maximum distance range in the distance histogram as a pre-selected height value H;

traversing, by a predefined step, each adjacent height value h around the pre-selected height value H to obtain a set of pre-selected plane, wherein each pre-selected plane in the set of pre-selected plane meets the equation ax+by+cz+d=0, d=−h; and each adjacent height value h meets h∈(h−σ, h+σ), σ being a predefined value, and σ being greater than or equal to the predefined step, and less than the predefined width;

calculating distances between each three-dimensional point and each pre-selected plane based on the three-dimensional point set and the set of pre-selected plane;

determining a three-dimensional point with the distance to the pre-selected plane being greater than a predefined support threshold as a support point of the pre-selected plane;

determining a pre-selected plane having the most support points in the pre-selected planes set as a target plane; and determining an average value of distances between each support point in the target plane and the reference plane as the height of the stereo camera.

Optionally, wherein the calculating distances between each three-dimensional point and each pre-selected plane based on the three-dimensional point set and the set of pre-selected plane, comprises:

calculating a distance Hi' between the $i^{th}$ three-dimensional point ($x_i$, $y_i$, $z_i$) and the first pre-selected plane by a second distance calculation equation based on the three-dimensional point set and the set of pre-selected plane, wherein 1≤i≤n, n being the total number of three-dimensional points in the three-dimensional point set, and the second distance calculation equation being:

$$H_i = \frac{|ax_i + by_i + cz_i + d|}{\sqrt{a^2 + b^2 + c^2}}$$

wherein the first pre-selected plane is a pre-selected plane in the set of pre-selected plane.

Optionally, wherein the ground image includes a plurality of contiguous ground images captured by the stereo camera; and wherein the determining depth information of each pixel on the ground image, comprises:

performing median filtering in time domain on the plurality of contiguous ground images to obtain a plurality of ground images after median filtering in time domain;

performing median filtering in space domain on the plurality of ground images after median filtering in time domain to obtain a plurality of ground images after median filtering in space domain; and determining depth information of each pixel on the ground images after median filtering in space domain.

Optionally, wherein the acquiring angle information of the stereo camera comprises:

acquiring the angle information of the stereo camera by an angle sensor in the stereo camera.

According to a second aspect of the present disclosure, there is provided a stereo camera, comprising:

an acquiring module, configured to angle information of a stereo camera, wherein the angle information includes a pitch angle and a tilt angle;

a capturing module, configured to capture a ground image of a scenario where the stereo camera is deployed;

a first determining module, configured to determine depth information of each pixel on the ground image;

an establishing module, configured to establish a three-dimensional point set based on the depth information of each pixel on the ground image, wherein the three-dimensional point set includes coordinate information of each three-dimensional point corresponding to each pixel of the ground image; and a second determining module, configured to determine the height of the stereo camera based on the angle information and the three-dimensional point set.

Optionally, wherein the second determining module comprises:

a first determining sub-module, configured to determine, based on the pitch angle and the tilt angle, a reference plane equation corresponding to a reference plane, wherein the reference plane is parallel to a horizon plane in a world coordinate system, and a center point of a lens of the stereo camera is within the reference plane;

a calculating sub-module, configured to calculate distances between each three-dimensional point in the three-dimensional point set and the reference plane to obtain a distance set; and a second determining module, configured to determine the height of the stereo camera based on the distances in the distance set.

Optionally, wherein the first determining sub-module is further configured to:

determine the reference plane equation ax+by+cz=0 based on the pitch angle θ and the tilt angle φ, such that a point (a, b, c) in a camera coordinate system meets an angle conversion equation:

$$[y] = [T^{-1}][x] \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, ($x_c$, $y_c$, $z_c$) is a point in the camera coordinate system, and ($x_y$, $y_y$, $z_y$) is a point in the world coordinate system corresponding to the point ($x_c$, $y_c$, $z_c$) in the camera coordinate system, wherein an origin of the world coordinate system coincides with an origin of the camera coordinate system, and coordinate axes of the world coordinate system are correspondingly parallel to coordinate axes of the world coordinate system.

Optionally, wherein the calculating sub-module is further configured to:

calculate a distance $H_i$ between an $i^{th}$ three-dimensional point ($x_i$, $y_i$, $z_i$) and the reference plane by using a first distance calculation equation based on the three-dimensional point set and the reference plane equation, wherein the distance set comprises the distance $H_i$, 1≤i·n, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is ax+by+cz=0, wherein a, b and c being coefficients of ax+by+cz=0.

Optionally, wherein the second determining sub-module is further configured to:

combine the distances in the distance set to obtain a target distance set, wherein distances in the target distance set are different from each other, each distance corresponds a number of times, and the number of times indicates a times count of occurrences of a corresponding distance in the distance set; and determine a distance corresponding a maximum number of times in the target distance set as the height of the stereo camera.

Optionally, wherein the reference plane equation is ax+by+cz=0, a, b and c being coefficients of ax+by+cz=0;

the second determining sub-module comprises:

a histogram establishing sub-module, configured to form, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;

a pre-selected value determining sub-module, configured to determine a middle point of width in the horizontal axis of a rectangular column corresponding to a maximum distance range in the distance histogram as a pre-selected height value H;

a set determining sub-module, configured to traverse, by a predefined step, each adjacent height value h around the pre-selected height value H to obtained a set of pre-selected plane, wherein each pre-selected plane in the set of pre-selected plane meets the equation ax+by+cz+d=0, d=−h; and each adjacent height value h meets h∈(h−σ, h+σ), σ being a predefined value, and σ being greater than or equal to the predefined step, and less than the predefined width;

a distance calculating sub-module, configured to calculate distances between each three-dimensional point and each pre-selected plane based on the three-dimensional point set and the set of pre-selected plane;

a support point determining sub-module, configured to determine, for each pre-selected plane, a three-dimensional point having a distance between the three-dimensional point and the pre-selected plane being greater than a predefined support threshold as a support point of a pre-selected plane;

a target plane determining sub-module, configured to determine a pre-selected plane having the most support points in the set of pre-selected planes as a target plane; and a height determining sub-module, configured to determine an average value of distances between all support points in the target plane and the reference plane as the height of the stereo camera.

Optionally, wherein the distance calculating sub-module is further configured to:

calculate, based on the three-dimensional point set and the set of pre-selected plane, a distance Hi' between an $i^{th}$ three-dimensional point $(x_i, y_i, z_i)$ and a first pre-selected plane by a second distance calculation formula, wherein $1 \le i \le n$, n being the total number of three-dimensional points in the three-dimensional point set, wherein the second distance calculation equation is as follows:

$$(H'_i)_i = \frac{|ax_i + by_i + cz_i + d|}{\sqrt{a^2 + b^2 + c^2}}$$

wherein the first pre-selected plane is a pre-selected plane in the set of pre-selected plane.

Optionally, the ground image includes a plurality of contiguous ground images captured by the stereo camera; and the first determining module is further configured to:

perform median filtering in time domain on the plurality of contiguous ground images to obtain ground images after median filtering in time domain;

perform median filtering in space domain on each ground image after median filtering in time domain to the ground images after median filtering in space domain; and determine depth information of each pixel on ground images after median filtering in space domain.

Optionally, where the acquiring module is further configured to:

acquire the angle information of the stereo camera by an angle sensor in the stereo camera.

Optionally, wherein the stereo camera is a binocular stereo camera or a time of flight (TOF) stereo camera.

According to a third aspect of the present disclosure, there is provided a stereo camera, comprising:

at least one processing component; and a memory;

Wherein the memory stores at least one instruction, configured to be executed by the at least one processing component, and configured to be executed by the at least one processing component to perform the instructions:

acquiring angle information of a stereo camera, wherein the angle information includes a pitch angle and a tilt angle;

capturing a ground image of a scenario where the stereo camera is deployed;

determining depth information of each pixel on the ground image;

establishing a three-dimensional point set based on the depth information of each pixel on the ground image, wherein the three-dimensional point set includes coordinate information of each three-dimensional point corresponding to each pixel of the ground image; and determining the height of the stereo camera based on the angle information and the three-dimensional point set.

Optionally, wherein the determining the height of the stereo camera based on the angle information and the three-dimensional point set, comprises:

determining, based on the pitch angle and the tilt angle, a reference plane equation corresponding to a reference plane, wherein the reference plane is parallel to a horizon plane in a world coordinate system, and a center point of a lens of the stereo camera is within the reference plane;

calculating distances between each three-dimensional point in the three-dimensional point set and the reference plane to obtain a distance set; and determining the height of the stereo camera based on the distances in the distance set.

Optionally, wherein the determining, based on the pitch angle and the tilt angle, a reference plane equation corresponding to a reference plane, comprises:

determining the reference plane equation ax+by+cz=0 based on the pitch angle θ and the tilt angle φ, such that a point (a, b, c) in a camera coordinate system meets an angle conversion equation:

$$[y] = [T^{-1}][x]; \text{ wherein } [x] = \begin{bmatrix} x_r \\ y_r \\ z_r \end{bmatrix}, [y] = \begin{bmatrix} x_c \\ y_c \\ z_c \end{bmatrix},$$

-continued $$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, and $(x_y, y_y, z_y)$ is a point in the world coordinate system corresponding to the point $(x_c, y_c, z_c)$ in the camera coordinate system, wherein an origin of the world coordinate system coincides with an origin of the camera coordinate system, and coordinate axes of the world coordinate system are correspondingly parallel to coordinate axes of the world coordinate system.

Optionally, wherein the calculating distances between each three-dimensional point in the three-dimensional point set and the reference plane to obtain a distance set, comprises:

calculating a distance $H_i$ between an $i^{th}$ three-dimensional point $(x_i, y_i, z_i)$ and the reference plane by using a first distance calculation equation based on the three-dimensional point set and the reference plane equation, wherein the distance set comprises the distance $H_i$, $1 \le i \le n$, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is $ax+by+cz=0$, a, b and c being coefficients of $ax+by+cz=0$.

Optionally, wherein the determining the height of the stereo camera based on the distances in the distance set, comprises:

combining the distances in the distance set to obtain a target distance set, wherein distances in the target distance set are different from each other, each distance corresponds a number of times, and the number of times indicates a times count of occurrences of a corresponding distance in the distance set; and determining a distance corresponding a maximum number of times in the target distance set as the height of the stereo camera.

Optionally, wherein the reference plane equation is $ax+by+cz=0$, a, b and c being coefficients of $ax+by+cz=0$; and wherein the determining the height of the stereo camera based on the distances in the distance set, comprises:

forming, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;

determining a middle point of width in the horizontal axis of a rectangular column having a maximum distance range in the distance histogram as a pre-selected height value H;

traversing, by a predefined step, each adjacent height value h around the pre-selected height value H to obtain a set of pre-selected plane, wherein each pre-selected plane in the set of pre-selected plane meets the equation $ax+by+cz+d=0$, $d=-h$; and each adjacent height value h meets $h \in (h-\sigma, h+\sigma)$, $\sigma$ being a predefined value, and $\sigma$ being greater than or equal to the predefined step, and less than the predefined width;

calculating distances between each three-dimensional point and each pre-selected plane based on the three-dimensional point set and the set of pre-selected plane;

determining a three-dimensional point with the distance to the pre-selected plane being greater than a predefined support threshold as a support point of the pre-selected plane;

determining a pre-selected plane having the most support points in the pre-selected planes set as a target plane; and determining an average value of distances between each support point in the target plane and the reference plane as the height of the stereo camera.

According to a fourth aspect of the present disclosure, there is provided a height acquisition system, comprises:

a remote control apparatus and a stereo camera; wherein the remote control apparatus is configured to remotely control the stereo camera; and the stereo camera is the stereo camera above, or the stereo camera is the stereo camera above.

According to a fifth aspect of the present disclosure, there is provided a height acquisition system, comprising: a remote control apparatus and a stereo camera; wherein the stereo camera is configured to:

acquire angle information of the stereo camera, wherein the angle information includes a pitch angle and a tilt angle;

capture a ground image of a scenario where the stereo vision camera is deployed; and send the angle information and the ground image to the remote control apparatus;

the remote control apparatus is configured to:

receive the angle information and the ground image;

determine depth information of each pixel on the ground image;

establish a three-dimensional point set based on depth information of each pixel on the ground image, wherein the three-dimensional point set includes coordinate information of each three-dimensional point corresponding to each pixel on the ground image; and determine height of the stereo camera based on the angle information and the three-dimensional point set.

Optionally, wherein the determine the height of the stereo camera based on the angle information and the three-dimensional point set, comprises:

determine, based on the pitch angle and the tilt angle, a reference plane equation corresponding to a reference plane, wherein the reference plane is parallel to a horizon plane in a world coordinate system, and a center point of a lens of the stereo camera is within the reference plane;

calculate distances between each three-dimensional point in the three-dimensional point set and the reference plane to obtain a distance set; and determine the height of the stereo camera based on the distances in the distance set.

Optionally, wherein the determine, based on the pitch angle and the tilt angle, a reference plane equation corresponding to a reference plane, comprises:

determine the reference plane equation $ax+by+cz=0$ based on the pitch angle $\theta$ and the tilt angle $\varphi$, such that a point (a, b, c) in a camera coordinate system meets an angle conversion equation:

$$[y] = [T^{-1}][x]; \text{ wherein } [x] = \begin{bmatrix} x_r \\ y_r \\ z_r \end{bmatrix}, [y] = \begin{bmatrix} x_c \\ y_c \\ z_c \end{bmatrix},$$

-continued $$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

[$T^{-1}$] is an inverse of matrix [$T$], ($x_c$, $y_c$, $z_c$) is a point in the camera coordinate system, and ($x_y$, $y_y$, $z_y$) is a point in the world coordinate system corresponding to the point ($x_c$, $y_c$, $z_c$) in the camera coordinate system, wherein an origin of the world coordinate system coincides with an origin of the camera coordinate system, and coordinate axes of the world coordinate system are correspondingly parallel to coordinate axes of the world coordinate system.

Optionally, wherein the calculate distances between each three-dimensional point in the three-dimensional point set and the reference plane to obtain a distance set, comprises:

calculate a distance $H_i$ between an $i^{th}$ three-dimensional point ($x_i$, $y_i$, $z_i$) and the reference plane by using a first distance calculation equation based on the three-dimensional point set and the reference plane equation, wherein the distance set comprises the distance $H_i$, $1 \leq i \leq n$, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is $ax+by+cz=0$, a, b and c being coefficients of $ax+by+cz=0$.

Optionally, wherein the determine the height of the stereo camera based on the distances in the distance set, comprises:

combine the distances in the distance set to obtain a target distance set, wherein distances in the target distance set are different from each other, each distance corresponds a number of times, and the number of times indicates a times count of occurrences of a corresponding distance in the distance set; and determine a distance corresponding a maximum number of times in the target distance set as the height of the stereo camera.

Optionally, wherein the reference plane equation is $ax+by+cz=0$, a, b and c being coefficients of $ax+by+cz=0$; and wherein the determine the height of the stereo camera based on the distances in the distance set, comprises:

form, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;

determine a middle point of width in the horizontal axis of a rectangular column having a maximum distance range in the distance histogram as a pre-selected height value H;

traverse, by a predefined step, each adjacent height value h around the pre-selected height value H to obtain a set of pre-selected plane, wherein each pre-selected plane in the set of pre-selected plane meets the equation $ax+by+cz+d=0$, $d=-h$; and each adjacent height value h meets $h \in (h-\sigma, h+\sigma)$, $\sigma$ being a predefined value, and $\sigma$ being greater than or equal to the predefined step, and less than the predefined width;

calculate distances between each three-dimensional point and each pre-selected plane based on the three-dimensional point set and the set of pre-selected plane;

determine a three-dimensional point with the distance to the pre-selected plane being greater than a predefined support threshold as a support point of the pre-selected plane;

determine a pre-selected plane having the most support points in the pre-selected planes set as a target plane; and determine an average value of distances between each support point in the target plane and the reference plane as the height of the stereo camera.

According to a fifth aspect of the present disclosure, there is provided a non-volatile computer-readable storage medium, which stores code instructions; wherein the code instructions are executed by a processor to perform the height acquisition method of a stereo camera as defined in the first aspect.

The technical solutions according to examples of the present disclosure may achieve the following beneficial effects:

In summary, examples of the present disclosure provide a stereo camera, method and system for acquiring a height of stereo camera thereof, the ground image of the scenario where the stereo vision camera is deployed is captured, then the three-dimensional point set recording coordinate information of each three-dimensional point corresponding to each pixel on the ground image is determined based on depth information of each pixel on the ground image, and the height of the stereo camera is determined based on the angle information and the three-dimensional point set. In this way, the stereo camera automatically determines the height thereof without defining an external reference structure, such that the operation complexity is lowered, and the cost for determining the height is reduced.

It is to be understood that both the foregoing general description and the following detailed description are exemplary and explanatory only and are intended to limit the present disclosure.

BRIEF DESCRIPTION OF THE DRAWINGS

In order to describe the technical solutions in examples of the present more clearly, the following briefly introduces the accompanying drawings required for describing the examples. Apparently, the accompanying drawings in the following description show merely some examples of the present disclosure, and a person of ordinary skill in the art may also derive other drawings from these accompanying drawings without creative efforts.

FIG. 3-1 is a flowchart of another height acquisition method of a stereo camera according to examples of the present disclosure;

FIG. 3-2 is a schematic diagram of a scenario image captured by a stereo camera according to examples of the present disclosure;

FIG. 3-3 is a schematic flowchart of a method for determining a height of a stereo camera based on angle information and a three-dimensional point set according to examples of the present disclosure;

FIG. 3-4 is a schematic diagram of a relation between a world coordinate system and a camera coordinate system according to examples of the present disclosure;

FIG. 3-5 illustrates schematic diagrams of a histogram according to examples of the present disclosure;

FIG. 4 is a schematic structural block diagram of a stereo camera according to examples of the present disclosure; and FIG. 5 is a schematic structural block diagram of another stereo camera according to examples of the present disclosure.

The accompanying drawings herein, which are incorporated into and constitute a part of the specification, illustrate examples consistent with the present disclosure, and together with the specification, serve to explain the principles of the present disclosure.

DETAILED DESCRIPTION

For clearer descriptions of the objectives, technical solutions and advantages of the present disclosure, the present disclosure is further described in detail with reference to the accompanying drawings. Apparently, examples described hereinafter are merely some exemplary ones for illustrating the present disclosure, instead of all the examples. Based on the examples of the present disclosure, all other examples derived by persons of ordinary skill in the art shall fall within the protection scope of the present disclosure.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

In a conventional stereo vision camera, before image capture and analysis, camera parameters need to be pre-defined, wherein the camera parameters may include an internal parameter (abbr.: IP) and an external parameter (abbr.: EP). The external parameter may include at least one of the parameter: a pitch angle, a tilt angle and a height. In the conventional methods for determining a height of a stereo vision camera, an external reference structure needs to be defined. For example, a calibration plate may be arranged to keep coincidence with the world coordinate system to acquire coordinates of characteristic points on the calibration plate. In addition, the calibration plate needs to be removed, such that central point three-dimensional points sampling is performed at different positions on the calibration plate, and the height of the stereo vision camera is determined by calculating a conversion matrix.

However, determining the height by defining the external reference structure is complicated in operation and needs a high cost.

Figure 1:
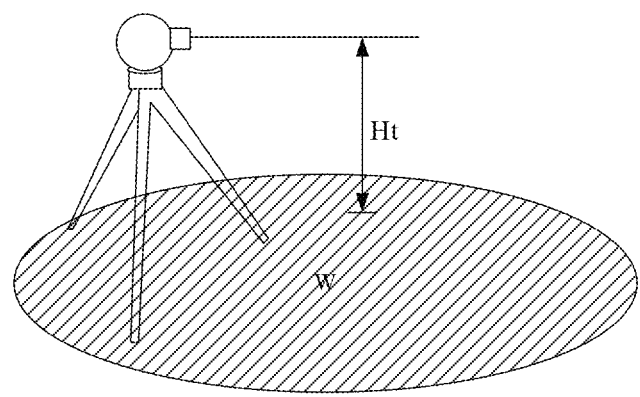
FIG. 1 is a schematic diagram of an implementation scenario of a height acquisition method of a stereo camera according to examples of the present disclosure.

Referring to FIG. 1, FIG. 1 is a schematic diagram of an implementation scenario of a height acquisition method of a stereo camera according to examples of the present disclosure. In this scenario, a stereo camera 110 is located indoors or outdoors.

Before capturing and analyzing an image, a camera parameter of a conventional stereo camera may be pre-defined, wherein the camera parameter may include an internal parameter (abbr.: IP) and/or an external parameter (abbr.: EP). The external parameter may include any one of the following parameters: a pitch angle, a tilt angle and a height. Calibration of the external parameters of the stereo camera is a premise and basis for three-dimensional measurement of the stereo camera, and is one of the most important parts for ensuring precision of an image processing result of the stereo camera. An incorrect camera external parameter may interfere the visual analysis for the stereo camera. As illustrated in FIG. 1, height of the stereo camera is height Ht thereof in a world coordinate system, which may be generally a distance from a central point of a lens of the stereo camera to a horizon W in the world coordinate system. The central point is an origin of a camera coordinate system of the stereo camera. The camera coordinate system is a plane coordinate system, and the horizon W is a plane extracted from the ground.

In examples of the present disclosure, the stereo camera captures a ground image of a scenario where the stereo camera is deployed, and the height of the stereo camera is determined based on the ground image and pre-acquired angle information. The stereo camera may include a processing component, an angle sensor (also known as a gyroscope) and a lens. The processing component may be a processor or a processing chip. The lens is configured to capture the ground image of the scenario where the stereo camera is deployed. The processing component is configured to determine the height of the stereo camera based on the ground image and the angle information pre-acquired by the angle sensor.

Figure 2:
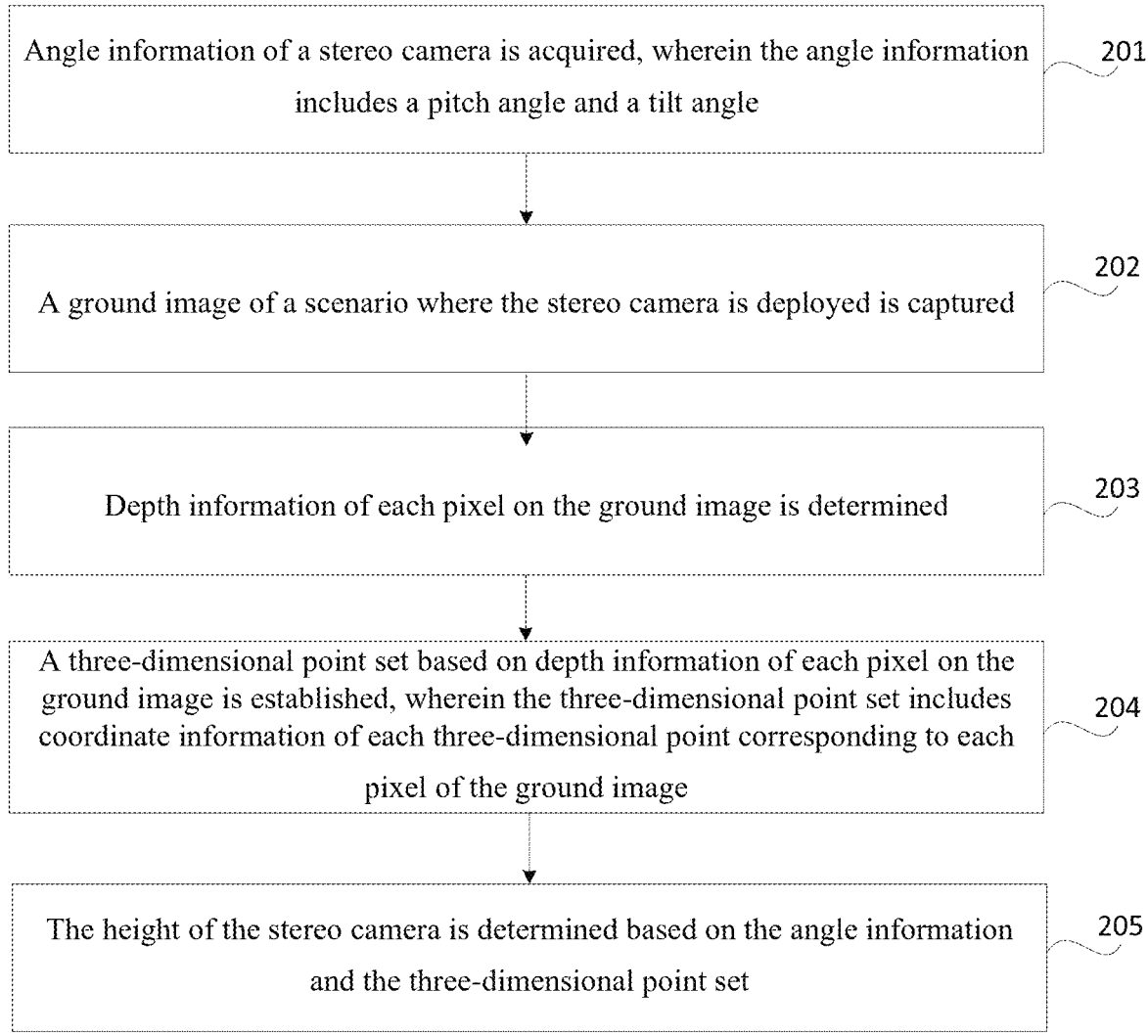
FIG. 2 is a flowchart of a height acquisition method of a stereo camera according to examples of the present disclosure.

As illustrated in FIG. 2, examples of the present disclosure provide a method for acquiring a height of a stereo camera, which is applied to the stereo camera as illustrated in FIG. 1. The method includes:

Step 201: Angle information of a stereo camera is acquired, wherein the angle information includes a pitch angle and a tilt angle;

Step 202: A ground image of a scenario where the stereo camera is deployed is captured;

Step 203: Depth information of each pixel on the ground image is determined;

Step 204: A three-dimensional point set based on depth information of each pixel on the ground image is established, wherein the three-dimensional point set includes coordinate information of each three-dimensional point corresponding to each pixel of the ground image; and Step 205: The height of the stereo camera is determined based on the angle information and the three-dimensional point set.

In examples of the disclosure, the act above may in fact be executed concurrently or may sometimes be executed in the reverse order, depending upon the acts involved.

In summary, based on the method for acquiring the height of a stereo camera according to examples of the present disclosure, the ground image of the scenario where the stereo camera is deployed is captured, and the three-dimensional point set including coordinate information of each three-dimensional point corresponding to each pixel on the ground image is determined based on depth information of each pixel on the ground image, and the height of the stereo camera is determined based on the angle information and the three-dimensional point set. In this way, the stereo camera may automatically determine the height without a definition for an external reference structure, and thereby lowing the operation complexity, and reducing cost for determining the height.

Figures 1, 3:
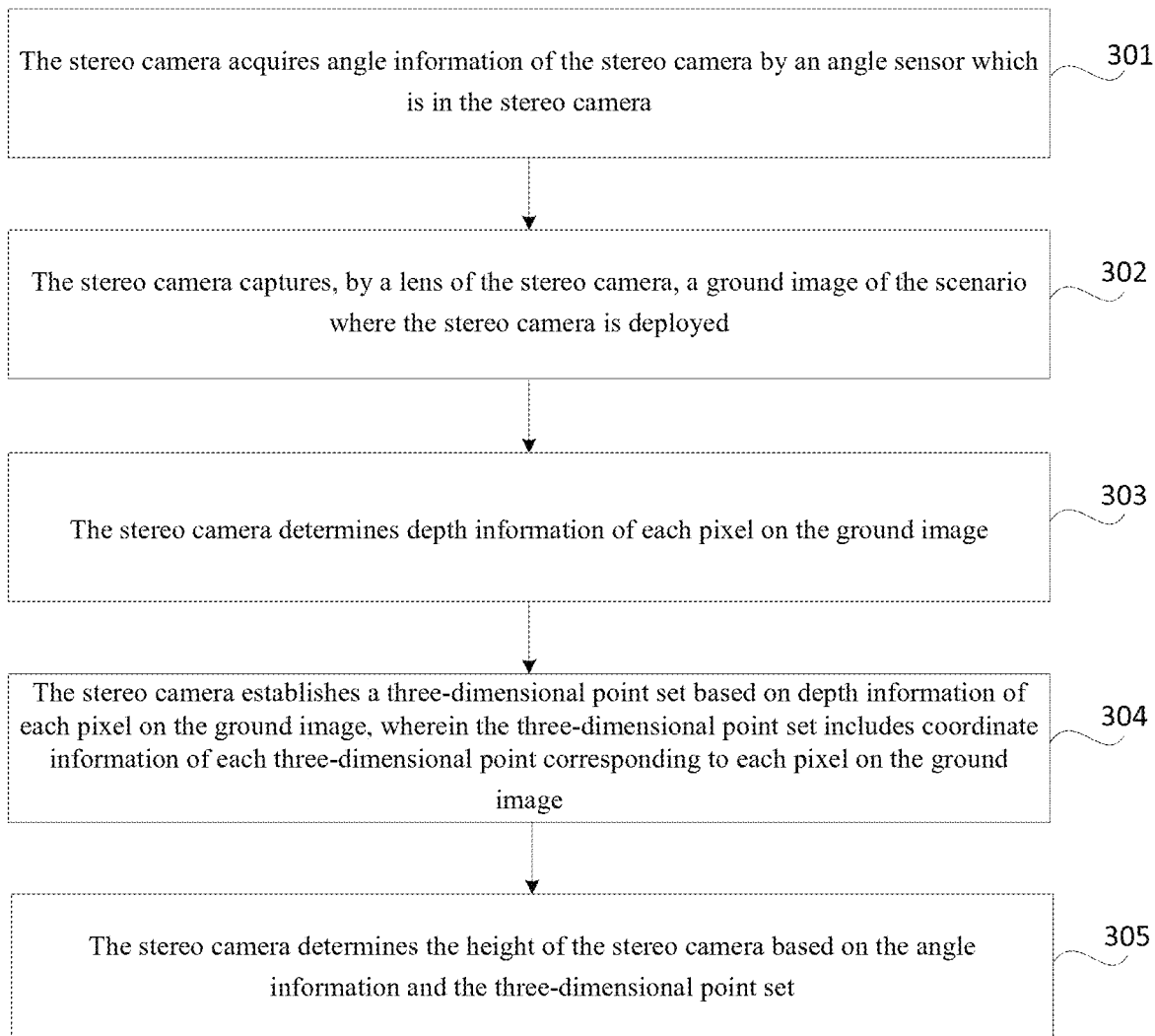
Figures 2, 3:
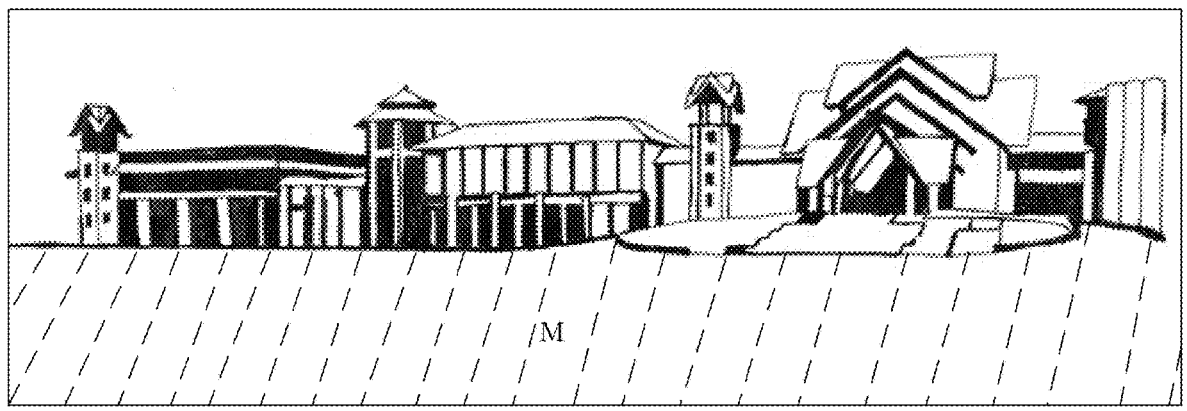

As illustrated in FIG. 3-1, examples of the present disclosure provide a method for acquiring height of a stereo camera, which is applied to the stereo camera as illustrated in FIG. 1. According to the method, the height of the stereo camera in a world coordinate system may be determined. The stereo camera may be a binocular stereo camera, a TOF stereo camera or the like, that is capable of acquiring stereo three-dimensional information. The method includes the following steps:

Step 301: The stereo camera acquires angle information of the stereo camera by an angle sensor which is in the stereo camera.

In examples of the present disclosure, the angle information includes a pitch angle and a tilt angle. The angle sensor may be arranged in the stereo camera to measure angle information of the stereo camera. Precisions of a pitch angle and a tilt angle acquired by the angle sensor are generally high. The angle sensor may be an angle sensor chip, a highly integrated chip may save space in the stereo camera.

Step 302: The stereo camera captures, by a lens of the stereo camera, a ground image of the scenario where the stereo camera is deployed.

In examples of the present disclosure, the stereo camera may be maintained at a current state, and may automatically capture a scenario image of a scenario where the stereo camera is deployed. The scenario image includes a ground image. Further, the scenario image includes one image, or a plurality of contiguous images, or a plurality of frames in a video. The stereo camera may extract a ground image from the scenario image, and perform following processing on the image, or the stereo camera may directly perform following processing on the ground image in the scenario image.

Step 303: The stereo camera determines depth information of each pixel on the ground image.

A depth of an image refers to the number of bits used for storing each pixel in the image. The depth of an image may be used to measure a color resolution of the image. The depth information is also information for describing the depth of the image.

The ground image (for example, a parallax image captured by a binocular stereo camera, or a depth image captured by a TOF stereo camera) acquired by the stereo camera may contain noise. The acquired ground image may be pre-processed to ensure accuracy of the depth information.

For example, in step 302, the stereo camera may capture a plurality of ground images, and generally the stereo camera may continuously capture within a predefined time duration to obtain a plurality of scenario images, and thus to obtain a plurality of ground images (each ground image may be a scenario image, or each ground image may be an image of a ground region in the corresponding scenario image). In examples of the present disclosure, a video may also be captured, and a plurality of contiguous frames in the video may be used as the scenario images to obtain a plurality of ground images. Then, a median filtering in time domain is performed on the plurality of contiguous ground images to obtain a plurality of ground images after median filtering in time domain; then a median filtering in space domain is performed on the plurality of ground images after median filtering in time domain to obtain a plurality of ground images after median filtering in space domain; and then depth information of each pixel on the ground images after median filtering in space domain is determined.

In examples of the present disclosure, wherein performing the median filtering in time domain on the plurality of contiguous ground images, refers to performing the median filtering in time domain on a corresponding pixel on each of the plurality of contiguous ground images, until the median filtering in time domain is performed on each pixel on ground images.

The median filtering in time domain may filter out information of inaccurate parallax caused by incorrect parallax calculation for an image, and the median filtering in space domain may filter out information of failure to calculate the parallax at a specific position in a specific scenario.

It should be noted that whether to perform the median filtering in time domain and the median filtering in space domain is determined based on the quality of an imaging the stereo camera captured. If the stereo camera has better performance and high precision, and the captured image meets the calculation requirement, the median filtering in time domain and the median filtering in space domain are not necessary. If the stereo camera has poor performance and low precision, and the captured image fails to satisfy the calculation requirement, the median filtering in time domain and/or the median filtering in space domain is necessary.

Further, the process of determining depth information of each pixel on the ground image by the stereo camera may be implemented by conventional methods. For example, when the stereo camera is a binocular stereo camera, a synchronous exposure image may be obtained by using the calibrated two cameras based on the bionics principle, and then three-dimensional depth information of each pixel on the acquired two-dimensional image is calculated.

Step 304: The stereo camera establishes a three-dimensional point set based on depth information of each pixel on the ground image, wherein the three-dimensional point set includes coordinate information of each three-dimensional point corresponding to each pixel on the ground image.

The stereo camera may determine coordinate information of each three-dimensional point based on the depth information of corresponding pixel on the ground image, and add the coordinate information of each three-dimensional point in the three-dimensional point set. The coordinate information may be coordinate values of each three-dimensional point in the world coordinate system. For example, assuming that the scenario image captured by the stereo camera in step 302 is as illustrated in FIG. 3-2, the ground image is an image corresponding to a region M (that is, a dotted-line region in FIG. 3-2), then the value of the three-dimensional point corresponding to the pixel x in the world coordinate system in a practical scenario of the scenario image may be determined based on the depth information of any pixel x in the region M.

It should be noted that when the stereo camera determines the three-dimensional point set based on the depth information of each pixel on the ground image, the each three-dimensional point may be screened in advance to exclude three-dimensional points having unqualified coordinate information to obtain a more accurate three-dimensional point set. In this way, the accuracy of the height of the stereo camera that is subsequently determined is improved.

For example, when the stereo camera is a binocular stereo camera, the ground image is a parallax image, and the stereo camera may determine whether the parallax corresponding to each pixel on the ground image is within a predefined parallax range. When the parallax corresponding to a pixel is not within the predefined parallax range, the pixel is excluded, that is, the coordinate information of the three-dimensional point corresponding to the pixel is not added to the three-dimensional point set. When the parallax corresponding to a pixel is within the predefined parallax range, the coordinate information of the three-dimensional point corresponding to the pixel is determined, and the coordinate information of the three-dimensional point is added to the three-dimensional point set.

For another example, when the stereo camera is a TOF stereo camera, the ground image is a depth image, and the stereo camera may determine whether the depth corresponding to each pixel on the ground image is within a predefined depth range. When the depth corresponding to a pixel is not within the predefined depth range, the pixel is excluded, that is, the coordinate information of the three-dimensional point corresponding to the pixel is not added to the three-dimensional point set. When the depth corresponding to a pixel is within the predefined depth range, the coordinate information of the three-dimensional point corresponding to the pixel is determined, and the coordinate information of the three-dimensional point is added to the three-dimensional point set.

Step 305: The stereo camera determines the height of the stereo camera based on the angle information and the three-dimensional point set.

For example, the method for determining the height of the stereo camera based on the angle information and the three-dimensional point set may be as illustrated in FIG. 3-3, and include the following steps:

Step 3051: A reference plane equation corresponding to a reference plane is determined based on the pitch angle and the tilt angle, wherein the reference plane is parallel to a horizon plane in a world coordinate system, and a center point of a lens of the stereo camera is within the reference plane.

Figures 3, 4:
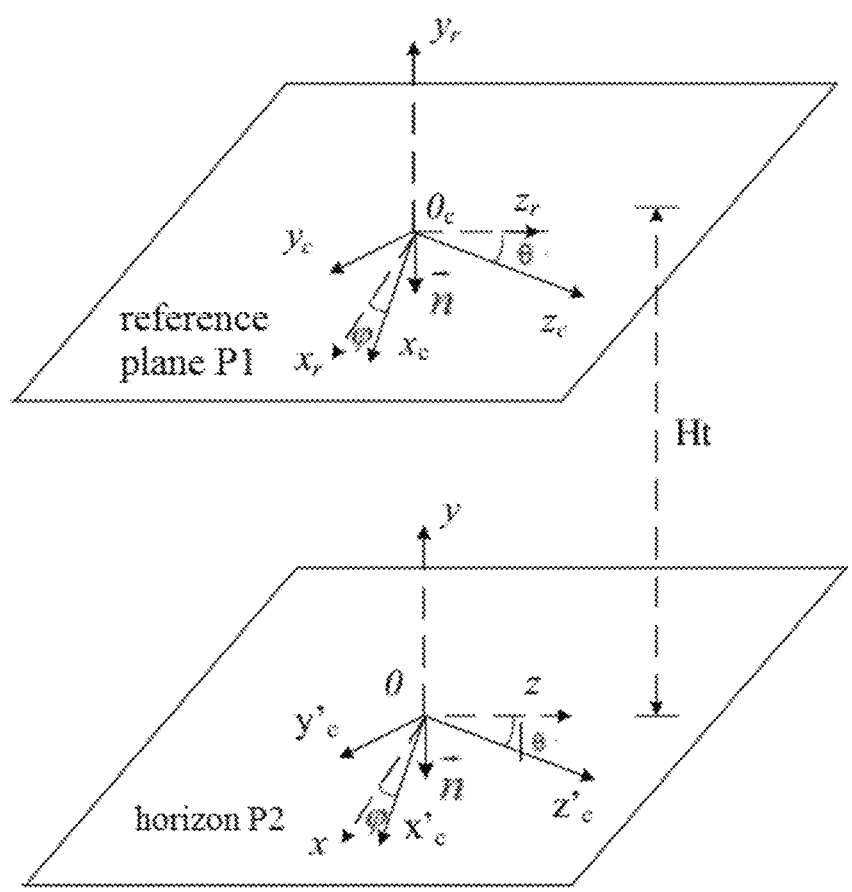

Referring to FIG. 3-4, FIG. 3-4 is a schematic diagram of a relation between a world coordinate system and a camera coordinate system. As illustrated in FIG. 3-4, assuming that variables (x, y, z) respectively represent coordinate axes of the stereo camera in the world coordinate system; variables $(x_c, y_c, z_c)$ respectively represent coordinate axes of the stereo camera in the camera coordinate system, and variables $(x_r, y_r, z_r)$ respectively represent coordinate axes of the stereo camera in a world reference coordinate system, wherein the world reference coordinate system is a coordinate system when the world coordinate system is translated along a positive direction of the y axis thereof to coincide with the origin of the camera coordinate system. Variables $(x'_c, y'_c, z'_c)$ represent a coordinate system when the camera coordinate system is translated along a negative direction of y axis thereof to coincide with the origin of the world coordinate system, wherein the origin of the world reference coordinate system coincides with the origin of the camera coordinate system, and the coordinate axes of the world reference coordinate system are parallel to the coordinate axes of the world coordinate system. Both the origin of the world reference coordinate system and the origin of the camera coordinate system are the central point of the lens of the stereo camera.

Based on the pitch angle and the tilt angle of the stereo camera in the current state acquired by the angle sensor, the following angle conversion equation may be determined according to the Euler's equation and the angle conversion relation in the world reference coordinate system:

$$\begin{bmatrix} x_r \\ y_r \\ z_r \end{bmatrix} = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix} \begin{bmatrix} x_c \\ y_c \\ z_c \end{bmatrix}$$

This angle conversion equation may be written as $[x]=[T][y]$ for simplicity.

An inverse transform is performed on the angle conversion equation to obtain $[y]=[T^{-1}][x]$.

In above formulae, assuming that $(x_c, y_c, z_c)$ is a point in the camera coordinate system, $(x_r, y_r, z_r)$ is a point in the world reference coordinate system corresponding to the point $(x_c, y_c, z_c)$ in the camera coordinate system, coordinate conversion between two coordinate systems with the same origin is a relation of angle conversion, wherein θ represents the pitch angel of the stereo camera, φ represents the tilt angle of the stereo camera, $$[x] = \begin{bmatrix} x_r \\ y_r \\ z_r \end{bmatrix}, [y] = \begin{bmatrix} x_c \\ y_c \\ z_c \end{bmatrix}, [T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

and $[T^{-1}]$ is an inverse of matrix $[T]$.

A unit normal vector of the world reference coordinate system is (0, 1, 0), and a start point of the vector (0, 1, 0) in the world reference coordinate system and the camera coordinate system are both the origin (0, 0, 0), and an end point of the vector (0, 1, 0) in the camera coordinate system may be obtained by a formula: $y=[T^{-1}][x]$. Assuming that finally in the camera coordinate system, a point corresponding to the end position of the vector (0, 1, 0) is (a, b, c), then a unit normal vector of the plane corresponding to the camera coordinate system is $\vec{n}=(a,b,c)$, and hence a reference plane equation $ax+by+cz=0$ of a reference plane P1 in the camera coordinate system may be obtained. The reference plane P1 is parallel to a horizon plane P2 of the world coordinate system.

As seen from the above, the process of determining a reference plane equation corresponding to a reference plane based on the pitch angle and the tilt angle includes:

determining the reference plane equation $ax+by+cz=0$ based on the pitch angle θ and the tilt angle φ, such that a point (a, b, c) in a camera coordinate system meets an angle conversion equation as follows:

$$[y] = [T^{-1}][x] \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, and $(x_y, y_y, z_y)$ is a point in the world coordinate system corresponding to the point $(x_c, y_c, z_c)$ in the camera coordinate system.

For example, assuming that the calculated point (a, b, c) in the camera coordinate system is (0.408, 0.577, 0.707), then the reference plane equation is $0.408x+0.577y+0.707z=0$.

Step 3052: Distances between each three-dimensional point in the three-dimensional point set and the reference plane are calculated to obtain a distance set.

The distance sent includes a plurality of distances corresponding to the three-dimensional point set. Optionally, based on the three-dimensional point set and the reference plane equation, a distance $H_i$ between an $i^{th}$ three-dimensional point $(x_i, y_i, z_i)$ and the reference plane is calculated by a first distance calculation formula, and the above distance set includes the distance Hi, $1 \leq i \leq n$, wherein n is the total number of three-dimensional points in the three-dimensional point set, and the first calculation equation is as follows:

$$H_i = \frac{|ax_i + by_i + cz_i|}{\sqrt{a^2 + b^2 + c^2}}$$

wherein the reference plane equation is $ax+by+cz=0$; a, b and c being coefficients of $ax+by+cz=0$.

For example, assuming that the reference plane equation is $x+2y+3z=0$, and a coordinate of a point in the three-dimensional point set is (2, 2, 2), then it is calculated by using the first calculation equation that the distance between the point and the reference plane is $$\frac{|1*2 + 2*2 + 3*2|}{\sqrt{1^2 + 2^2 + 3^2}} = \frac{12}{\sqrt{14}}.$$

Step 3503: The height of the stereo camera is determined based on a maximum distance in the distance set.

In examples of the present disclosure, the method for determining the height of the stereo camera based on the maximum distance in the distance set may be performed in a plurality of implementation ways. The following two implementation manners are described as examples of the present disclosure:

In a first implementation manner, the maximum distance in the distance set may be directly determined as the height of the stereo camera, that is, the maximum distance in distances between each three-dimensional point and the reference plane is determined as the height of the stereo camera. The first implementation manner for determining the height is relatively simple.

In a second implementation manner, the height of the stereo camera may be determined based on a histogram. The second implementation manner for determining the height achieves a high precision. The second implementation manner includes the following steps:

Step a: A predefined width is determined as a class width, and then a distance histogram is established by counting the distance set, wherein a width in a horizontal axis of each rectangular column in the distance histogram indicates a distance range, and a length in a vertical axis of each rectangular column in the distance histogram indicates the number of distances within the distance range.

It should be noted that the number of distances within the distance range is the number of corresponding distances in three-dimensional points within the corresponding distance range.

Figures 3, 4, 5:
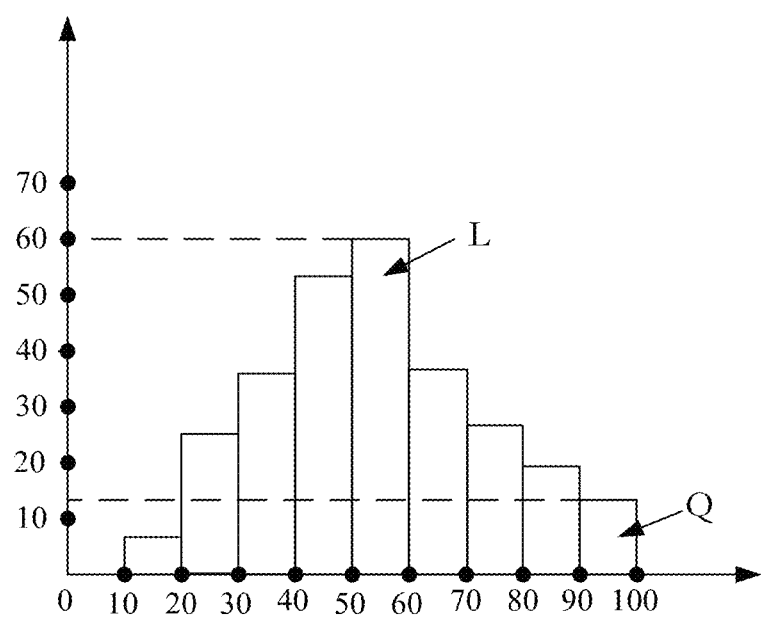
Figure 4:
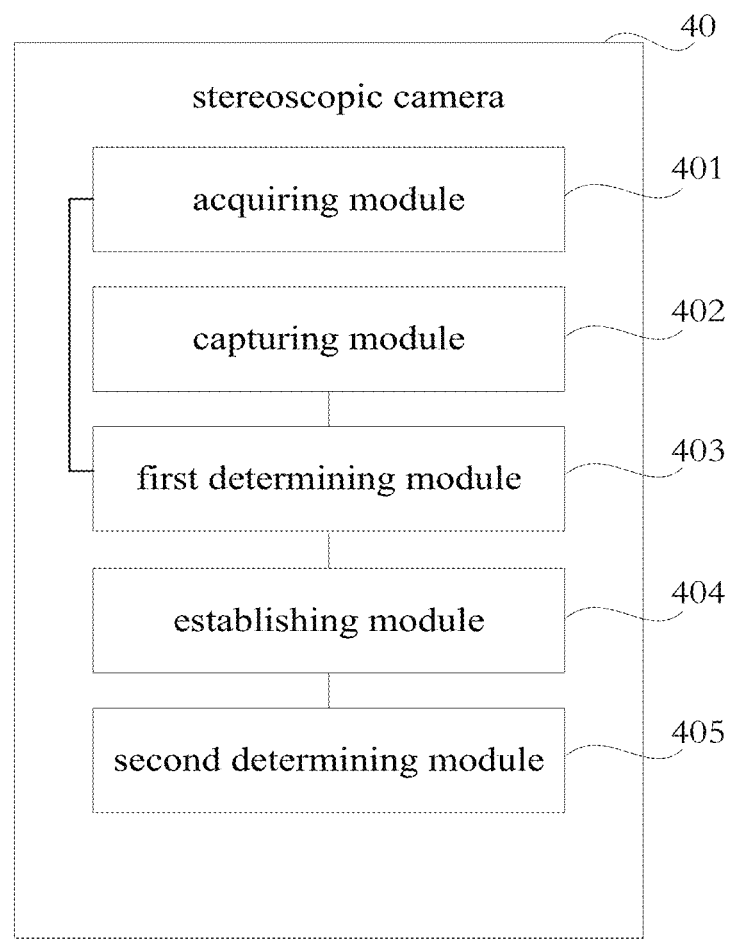
Figure 5:
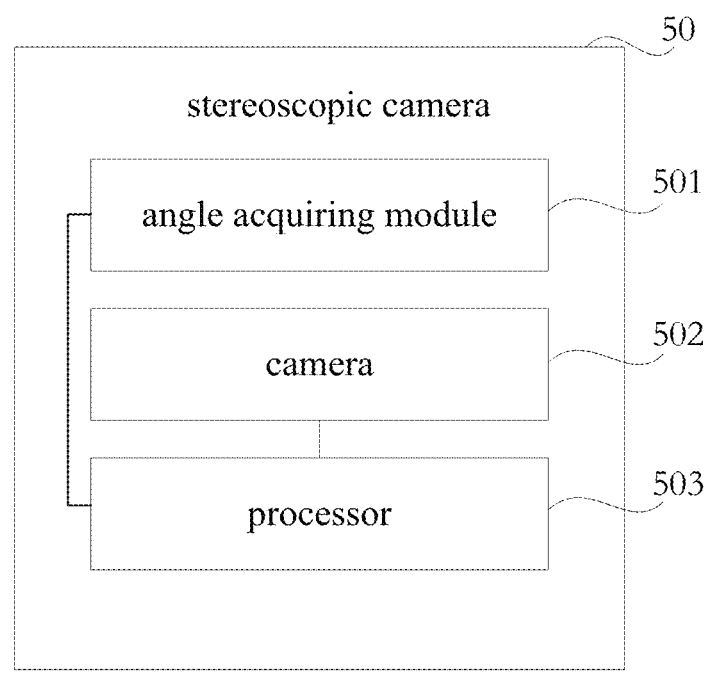

Since the ground image includes a plurality of pixels, that is, a plurality of three-dimensional points, the height of the stereo camera may be determined based on the distances between each of the plurality of three-dimensional points and the reference plane, wherein a visual manner to count distance is the distance histogram. As illustrated in FIG. 3-5, assuming that the predefined width is 10 cm, then the class width is determined as 10 cm, and the class width may be determined as a step for drawing the histogram, and the distance histogram is established by counting the distance set. The horizontal axis of the histogram is in centimeters; (in examples of the present disclosure, the unit of the horizontal axis of the histogram may be defined according to the specific situation, and FIG. 3-5 is only an illustrative description). The vertical axis of the histogram is in pieces. The width in the horizontal axis of each rectangular column in the histogram represents the distance range, and the length in the vertical axis of each rectangular column in the histogram represents the number of distances in the distance set within the distance range. For example, the width of a rectangular column L in the horizontal axis represents a distance range is: 50 to 60 cm, and the length in the vertical axis of the rectangular column represents the number of distances in the distance sent within the distance range of 50 to 60 cm is: 60.

Step b: A middle point of the width in the horizontal axis of a rectangular column, corresponding to a maximum distance range in the distance histogram, is determined as a pre-selected height value H.

In examples of the present disclosure, the rectangular column including the maxim distance is a rectangular column corresponding to a maximum distance range. For example, as illustrated in FIG. 3-5, the rectangular column including the maximum distance is a rectangular column Q, (that is, the rectangular column corresponding to the maximum distance range is the rectangular column Q), the corresponding distance range of the rectangular column Q is 90 to 100 cm, and a middle point of width in the horizontal axis of the rectangular column Q is 95. In this case, the pre-selected height value H is 95. In examples of the present disclosure, if the stereo camera does not request a strict requirement on the precision, the pre-selected height value may be directly determined as height value of the external parameters.

Step c: A set of pre-selected plane is determined by traversing, by a predefined step, each adjacent height value h around the pre-selected height value H, wherein each pre-selected plane in the set of pre-selected plane meets the equation $ax+by+cz+d=0$, $d=-h$; and each adjacent height value h meets h☐(h−σ, h+σ), σ being a predefined value, and σ being greater than or equal to the predefined step, and less than the predefined width. For example, if the predefined step is f and the predefined width is g, $f \leq \sigma < g$.

Step b is actually a rough selection of the height, and step c is actually an accurate selection of the height. For example, assuming that σ is 2, H is 95 and the predefined step is 1, then h☐(95−2, 95+2), that is, h☐(93, 97); and assuming that the reference plane equation $ax+by+cz=0$ is $x+2y+3z=0$, then the set of pre-selected plane includes: $x+2y+3z-93=0$, $x+2y+3z-94=0$, $x+2y+3z-95=0$, $x+2y+3z-96=0$ and $x+2y+3z-97=0$.

Step d: Distances between each three-dimensional point and each pre-selected plane are obtained based on the three-dimensional point set and the set of pre-selected plane.

Optionally, assuming that a first pre-selected plane is a pre-selected plane in the set of pre-selected plane, then step d may include: calculating a distance $H_i'$ between a $i^{th}$ three-dimensional point $(x_i, y_i, z_i)$ and the first pre-selected plane by a second calculation equation based on the three-dimensional point set and the set of pre-selected plane, wherein 1≤i≤n, n being the total number of three-dimensional points in the three-dimensional point set, and the second distance calculation equation is as follows:

$$H'_i = \frac{|ax_i + by_i + cz_i + d|}{\sqrt{a^2 + b^2 + c^2}}.$$

Optionally, distances between each three-dimensional point in the three-dimensional point set and each pre-selected plane in the set of pre-selected plane may be re-counted by the second distance calculation equation above.

For example, assuming that the equation corresponding to the first pre-selected plan is x+2y+3z−96=0, and a coordinate of a point in the three-dimensional point set is (2, 2, 2), then the distance between the point to the first pre-selected plane determined by the equation x+2y+3z−96=0 is:

$$\frac{|1*2 + 2*2 + 3*2 - 96|}{\sqrt{1^2 + 2^2 + 3^2}} = \frac{84}{\sqrt{14}}.$$

Step e: For each pre-selected plane, a three-dimensional point having a distance between the three-dimensional point and the pre-selected plane being greater than a predefined support threshold is determined as a support point of the pre-selected plane.

For example, assuming that the predefined support threshold is $h_t$, and a distance $H_i'$ between the $i^{th}$ three-dimensional point $(x_i, y_i, z_i)$ and the first pre-selected plane is obtained by the second distance calculation formula, Hi'>$h_t$, and the point $(x_i, y_i, z_i)$ is a support point of the first pre-selected plane ax+by+cz+d=0.

Step f: A pre-selected plane having the largest number of support points in the set of pre-selected plane is determined as a target plane.

Since the conventional ground is contiguous, if a pre-selected plane has the largest number of support points, the three-dimensional point are more densely distributed in the pre-selected plane, and the pre-selected plane is more approximate to the ground of the world coordinate system. Therefore, the pre-selected plane having the largest number of support points in the set of pre-selected plane may be determined as the target plane. The target plane may represent the horizon plane of the world coordinate system.

Step g: An average value of distances between all the support points in the target plane and the reference plane is determined as the height of the stereo camera.

In step a to step g, the pre-selected height value is firstly determined based on the distance set by drawing a histogram, then the set of pre-selected plane is determined based on the pre-selected height value and the target plane representing the ground of the world coordinate system is determined, and finally an average value of the distances between each support point in the target plane and the reference plane is determined as the height of the stereo camera. According to this method, a rough selection of the height is performed first, and then an accurate selection of the height is performed. In this way, the height of the stereo camera obtained has a high accuracy, and no dedicated external reference structure needs to be arranged.

In examples of the present disclosure, the above steps 303 to 305 may also be performed by a remote control device.

For example, after the stereo camera acquires the angle information and the ground image of the stereo camera through steps 301 and 302, the angle information and the ground image may be sent to the remote control apparatus. The remote control apparatus determines depth information of each pixel on a ground image, and then determines the three-dimensional point set based on depth information of each pixel on the ground image, and determines the height of the stereo camera based on the angle information and the three-dimensional point set. The remote control apparatus may be a computer or a server or the like device.

In summary, examples of the present disclosure provide a method for acquiring height of a stereo camera, the ground image of the scenario where the stereo camera is deployed is captured, the three-dimensional point set which includes coordinate information of each three-dimensional point corresponding to each pixel on the ground image is determined based on depth information of each pixel on the ground image, and the height of the stereo camera is determined based on the angle information and the three-dimensional point set. In this way, the stereo camera may determine the height automatically thereof without defining an external reference structure, such that the operation complexity is lowered, and the cost for determining the height is reduced. In addition, in examples of the present disclosure, as long as the image captured by the stereo camera include the ground image, the stereo camera may determine the height by referencing the ground image thereof. The way of determining the external parameters is concise, and has high robustness.

Further, since during determination of the height of the stereo camera, the external reference structure does not need to be set up, the operating personnel may not handle the on-site environment. Therefore, the staff does not need to handle the environment, and does not need to be in the vicinity of the stereo camera, and thereby the stereo camera could be controlled remotely.

As illustrated in FIG. 4, examples of the present disclosure provide a stereo camera 40, the stereo camera 40 includes:

an acquiring module 401, configured to acquire angle information of the stereo camera, wherein the angle information includes a pitch angle and a tilt angle;

a capturing module 402, configured to capture a ground image of a scenario where the stereo camera is deployed;

a first determining module 403, configured to determine depth information of each pixel on the ground image;

an establishing module 404, configured to establish a three-dimensional point set based on depth information of each pixel on the ground image, wherein the three-dimensional point set includes coordinate information of each three-dimensional point corresponding to each pixel on the ground image; and a second determining module 405, configured to determine height of the stereo camera based on the angle information and the three-dimensional point set.

The second determining module 405 includes:

a first determining sub-module, configured to determine a reference plane equation corresponding to a reference plane based on the pitch angle and the tilt angle, wherein the reference plane is parallel to a horizon plane in a world coordinate system, and a center point of a lens of the stereo camera is within the reference plane.

a calculating sub-module, configured to calculate distances between each three-dimensional point in the three-dimensional point set and the reference plane to obtain a distance set; and a second determining module, configured to determine the height of the stereo camera based on a maximum distance in the distance set.

Optionally, the first determining sub-module is further configured to:

determine the reference plane equation ax+by+cz=0 based on the pitch angle θ and the tilt angle φ, such that a point (a, b, c) in a camera coordinate system meets an angle conversion equation as follows:

$$[y] = [T^{-1}][x] \text{ wherein } [x] = \begin{bmatrix} x_r \\ y_r \\ z_r \end{bmatrix},$$

$$[y] = \begin{bmatrix} x_c \\ y_c \\ z_c \end{bmatrix}, [T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, $(x_y, y_y, z_y)$ is a point in the world coordinate system corresponding to the point $(x_c, y_c, z_c)$ in the camera coordinate system, an origin of the world coordinate system coincides with an origin of the camera coordinate system, and coordinate axes of the world coordinate system are correspondingly parallel to coordinate axes of the world coordinate system.

Optionally, the calculating sub-module is further configured to:

calculate a distance Hi between an $i^{th}$ three-dimensional point $(x_i, y_i, z_i)$ and the reference plan by a first distance calculation equation based on the three-dimensional point set and the reference plane equation, wherein the distance set includes the distance Hi, 1≤i≤n, n being the total number of three-dimensional points in the three-dimensional point set, and the first distance calculation equation is as follows:

$$H_i = \frac{|ax_i + by_i + cz_i|}{\sqrt{a^2 + b^2 + c^2}}$$

wherein the reference plane equation is ax+by+cz=0, a, b and c being coefficients of ax+by+cz=0.

Optionally, the second determining sub-module is further configured to:

combine distances in the distance set to obtain a target distance set, wherein value of each distance in the target distance set are different from each other, each distance has a number of times indicating number of a same distance in the distance set; and determine a distance having a maximum number of times in the target distance set as the height of the stereo camera.

Optionally, the reference plane equation is ax+by+cz=0, a, b and c being coefficients of ax+by+cz=0.

The second determining sub-module includes:

a histogram establishing sub-module, configured to count the distance set to establish a distance histogram by using a predefined width as a class width. Wherein a width in a horizontal axis of each rectangular column in the distance histogram indicates a distance range, and a length in a vertical axis of each rectangular column in the distance histogram indicates the number of distances within the distance range;

a pre-selected value determining sub-module, configured to determine a middle point of width in the horizontal axis of a rectangular column corresponding to a maximum distance range in the distance histogram as a pre-selected height value H;

a set determining sub-module, configured to traverse, by a predefined step, each adjacent height value h around the pre-selected height value H to obtained a set of pre-selected plane, wherein each pre-selected plane in the set of pre-selected plane meets the equation ax+by+cz+d=0, d=−h; and each adjacent height value h meets h□(h−σ, h+σ), σ being a predefined value, and σ being greater than or equal to the predefined step, and less than the predefined width;

a distance calculating sub-module, configured to calculate distances between each three-dimensional point and each pre-selected plane based on the three-dimensional point set and the set of pre-selected plane;

a support point determining sub-module, configured to determine, for each pre-selected plane, a three-dimensional point having a distance between the three-dimensional point and the pre-selected plane being greater than a predefined support threshold as a support point of a pre-selected plane;

a target plane determining sub-module, configured to determine a pre-selected plane having the most support points in the set of pre-selected planes as a target plane; and a height determining sub-module, configured to determine an average value of distances between each support point in the target plane and the reference plane as the height of the stereo camera.

Optionally, the distance calculating sub-module is further configured to:

calculate, based on the three-dimensional point set and the set of pre-selected plane, a distance Hi' between an $i^{th}$ three-dimensional point $(x_i, y_i, z)$ and a first pre-selected plane by a second distance calculation formula, wherein 1≤i≤n, n being the total number of three-dimensional points in the three-dimensional point set, wherein the second distance calculation equation is as follows:

$$H'_i = \frac{|ax_i + by_i + cz_i + d|}{\sqrt{a^2 + b^2 + c^2}}$$

wherein the first pre-selected plane is a pre-selected plane in the set of pre-selected plane.

Optionally, the ground image includes a plurality of contiguous ground images captured by the stereo camera; and the first determining module 403 is further configured to:

perform median filtering in time domain on the plurality of contiguous ground images to obtain ground images after median filtering in time domain;

perform median filtering in space domain on each ground image after median filtering in time domain to ground images after median filtering in space domain; and determine depth information of each pixel on ground images after median filtering in space domain.

Optionally, the acquiring module 401 is further configured to:

acquire the angle information of the stereo camera by an angle sensor in the stereo camera.

With respect to the apparatus in above examples, details about performing corresponding acts by different modules have been described in examples of the method, which are not given herein any further.

In summary, in the stereo camera according to examples of the present disclosure, the capturing module captures a ground image of a scenario where the stereo camera is deployed, the establishing module establishes the three-dimensional point set including coordinate information of each three-dimensional point corresponding to each pixel on the ground image, and the second determining module determines the height of the stereo camera based on the angle information and the three-dimensional point set. In this way, the stereo camera may determine the height automatically thereof without defining an external reference structure, such that the operation complexity is lowered, and the cost for determining the height is reduced.

As illustrated in FIG. 5, examples of the present disclosure provide a stereo camera 50. The stereo camera 50 includes:

an angle acquiring module 501, configured to acquire angle information of the stereo camera, wherein the angle information includes a pitch angle and a tilt angle;

a camera 502, configured to capture a ground image of a scenario where the stereo camera is deployed; and a processor 503, configured to determine depth information of each pixel on the ground image.

The processor 503 is further configured to establish a three-dimensional point set based on depth information of each pixel on the ground image, wherein the three-dimensional point set includes coordinate information of each three-dimensional point corresponding to each pixel on the ground image.

The processor 503 is further configured to determine height of the stereo camera based on the angle information and the three-dimensional point set.

Optionally, the processor 503 is further configured to:

determine a reference plane equation corresponding to a reference plane based on the pitch angle and the tilt angle, wherein the reference plane is parallel to a the horizon in a world coordinate system, and a center point of a lens of the stereo camera is within the reference plane;

calculate distances between each three-dimensional point in the three-dimensional point set and the reference plane to obtain a distance set; and determine the height of the stereo camera based on distances in the distance set.

Optionally, the processor 503 is further configured to:

determine the reference plane equation $ax+by+cz=0$ based on the pitch angle $\theta$ and the tilt angle $\varphi$, such that a point (a, b, c) in a camera coordinate system meets an angle conversion equation as follows:

$$[y] = [T^{-1}][x] \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, $(x_y, y_y, z_y)$ is a point in the world coordinate system corresponding to the point $(x_c, y_c, z_c)$ in the camera coordinate system, an origin of the world coordinate system coincides with an origin of the camera coordinate system, and coordinate axes of the world coordinate system are correspondingly parallel to coordinate axes of the world coordinate system.

Optionally, the processor 503 is further configured to:

calculate a distance Hi between an $i^{th}$ three-dimensional point $(x_i, y_i, z_i)$ by a first distance calculation equation based on the three-dimensional point set and the reference plane equation, wherein the distance set includes the distance $H_i$, $1 \leq i \leq n$, n being the total number of three-dimensional points in the three-dimensional point set, and the first distance calculation equation is as follows:

$$H_i = \frac{|ax_i + by_i + cz_i|}{\sqrt{a^2 + b^2 + c^2}}$$

wherein the reference plane equation is $ax+by+cz=0$, a, b and c being coefficients of $ax+by+cz=0$.

Optionally, the processor 503 is further configured to:

determine a maximum distance in distances between each three-dimensional point and the reference plane as the height of the stereo camera.

Optionally, the reference plane equation is $ax+by+cz=0$, a, b and c being coefficients of $ax+by+cz=0$; and the processor 503 is further configured to:

count the distance set to establish a distance histogram by using a predefined width as a class width. Wherein a width in a horizontal axis of each rectangular column in the distance histogram indicates a distance range, and a length in a vertical axis of each rectangular column in the distance histogram indicates the number of distances within the distance range;

determine a middle point of width in the horizontal axis of the rectangular column corresponding to a maximum distance range in the distance histogram as a pre-selected height value H;

traverse each adjacent height value h around the pre-selected height value H to determine a set of pre-selected plane by a predefined step, wherein each pre-selected plane in the set of pre-selected plane meets the equation $ax+by+cz+d=0$, $d=-h$; and each adjacent height value h meets $h \in (h-\sigma, h+\sigma)$, $\sigma$ being a predefined value, and $\sigma$ being greater than or equal to the predefined step, and less than the predefined width; that is, $f \leq \sigma < g$, wherein f being the predefined step, g being the predefined width;

calculate distances between each three-dimensional point in the three-dimensional point set and each pre-selected plane based on the three-dimensional point set and the set of pre-selected plane;

for each pre-selected plane, determine a three-dimensional point, with the distance between the three-dimensional point and the pre-selected plane being greater than a predefined support threshold, as a support point of the pre-selected plane;

determine a pre-selected plane having the most support points in the set of pre-selected plane as a target plane; and determine an average value of distances between each support point in the target plane and the reference plane as the height of the stereo camera.

Optionally, the processor 503 is further configured to:

calculate a distance $H_i'$ between the $i^{th}$ three-dimensional point $(x_i, y_i, z_i)$ and the first pre-selected plane by a second distance calculation equation based on the three-dimensional point set and the set of pre-selected plane, wherein $1 \leq i \leq n$, n being the total number of three-dimensional points in the three-dimensional point set, and the second distance calculation equation is as follows:

$$H'_i = \frac{|ax_i + by_i + cz_i + d|}{\sqrt{a^2 + b^2 + c^2}}$$

wherein the first pre-selected plane is a pre-selected plane in the set of pre-selected plane.

Optionally, the ground image includes a plurality of contiguous ground images captured by the stereo camera; and the processor 503 is further configured to:

median filtering in time domain on the plurality of contiguous ground images to obtain ground images after median filtering in time domain;

perform median filtering in space domain on each ground image after median filtering in time domain to ground images after median filtering in space domain; and determine depth information of each pixel on ground images after median filtering in space domain.

Optionally, the angle acquiring module 501 is an angle sensor, wherein the angle sensor is in the stereo camera.

Optionally, the stereo camera according to examples of the present disclosure is a binocular stereo camera or a TOF stereo camera.

In summary, in the stereo camera according to examples of the present disclosure, the camera captures the ground image of a scenario where the stereo camera is deployed, and the processor determines the three-dimensional point set which includes coordinate information of each three-dimensional point corresponding to each pixel on the ground image, and determines the height of the stereo camera based on the angle information and the three-dimensional point set. In this way, the stereo camera may determine the height automatically thereof without defining an external reference structure, such that the operation complexity is lowered, and the cost for determining the height is reduced.

With respect to the apparatus in above examples, details about performing corresponding operations by different modules have been described in the method examples, which are not given herein any further.

Examples of the present disclosure provide a stereo camera, the stereo camera includes:

at least one processing component, wherein the processing component may be a processor or a processing chip; and a memory;

wherein the memory stores at least one program, configured to be executed by the at least one processing component, and configured to be executed by the at least one processing component to perform the method for acquiring height of stereo camera according to above examples.

The stereo camera further includes an angle acquiring module, for example, an angle sensor, configured to acquire angle information of the stereo camera, wherein the angle information includes a pitch angle and a tilt angle; and a camera, configured to capture a ground image of a scenario where the stereo camera is deployed.

Examples of the present disclosure further provide a system for acquiring height of a stereo camera, the system includes: a remote control apparatus and a stereo camera; wherein the remote control apparatus is configured to remotely control the stereo camera; the remote control apparatus may be a smart phone, a computer, a wearable device, a server, or the like.

The stereo camera is the stereo camera as described in above examples of the present disclosure.

Examples of the present disclosure further provide system for acquiring height of a stereo camera, the system includes: a remote control apparatus and a stereo camera; wherein the remote control apparatus may be a smart phone, a computer, a wearable device, a server, or the like.

The stereo camera is configured to: acquire angle information of the stereo camera (this process may be referenced to step 301 as described above), wherein the angle information includes a pitch angle and a tilt angle; capture a ground image of a scenario where the stereo camera is deployed (this process may be referenced to step 302 as described above); and send the angle information and the ground image to the remote control apparatus.

The remote control apparatus is configured to: receive the angle information and the ground information; determine depth information of each pixel on the ground image (this process may be referenced to step 303 as described above); establish a three-dimensional point set based on depth information of each pixel on the ground image (this process may be referenced to step 304 as described above), wherein the three-dimensional point set includes coordinate information of each three-dimensional point corresponding to the each pixel on the ground image; and determine height of the stereo camera based on the angle information and the three-dimensional point set (this process may be referenced to step 305 as described above).

In summary, in the height acquisition system of a stereo camera according to examples of the present disclosure, the ground image of the scenario where the stereo camera is deployed is captured, the three-dimensional point set includes coordinate information of the three-dimensional point corresponding to each pixel on the ground image is determined based on depth information of each pixel on the ground image, and the height of the stereo camera is determined based on the angle information and the three-dimensional point set. In this way, the stereo camera may automatically determine the height without a definition for an external reference structure, thereof lowing the operation complexity, and reducing cost for determining the height. In addition, in examples of the present disclosure, as long as an image captured by the stereo camera include a ground image, the stereo camera may use the ground image as a reference to determine the height thereof. The way of determining the external parameters is concise, and has high robustness.

Further, since the external reference structure is unnecessary during determination of the height of the stereo camera, the operating personnel may not handle the on-site environment. Therefore, the staff does not need to handle the environment, and no need to be in the vicinity of the stereo camera, thereby the stereo camera could be controlled remotely.

In examples, the present disclosure further provides a non-transitory computer-readable storage medium, which stores code instructions; wherein the code instructions are executed by a processor to perform the height acquisition methods of a stereo camera as described in the above examples. For example, the non-volatile computer-readable storage medium may be a read-only memory (ROM), a random access memory (RAM), a compact disc ROM (CD-ROM), a magnetic tape, a floppy disk, an optical data storage device or the like.

Other examples of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and examples are to be considered as exemplary only, with a true scope and spirit of the present disclosure is indicated by the following claims.

The technical solutions according to examples of the present disclosure may achieve the following beneficial effects:

In summary, examples of the present disclosure provide a stereo camera, method and system for acquiring height of stereo camera thereof, the ground image of the scenario where the stereo camera is deployed is captured, then the three-dimensional point set recording coordinate information of each three-dimensional point corresponding to each pixel on the ground image is determined based on depth information of each pixel on the ground image, and the height of the stereo camera is determined based on the angle information and the three-dimensional point set. In this way, the stereo camera automatically determines the height thereof without defining an external reference structure, such that the operation complexity is lowered, and the cost for determining the height is reduced.

Other examples of the present application will be readily apparent to those skilled in the technical field, the application is intended to cover any variations, uses, or adaptations of the application, which are in accordance with the general principles of the application and include common general knowledge or common technical means in the art that are not disclosed herein. The specification and examples are to be regarded as illustrative only, the scope and principle of the application is pointed out by the claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for acquiring a height of a stereo camera, applied to the stereo camera, the method comprising:
    acquiring angle information of a stereo camera, wherein the angle information includes a pitch angle and a tilt angle;
    capturing a ground image of a scenario where the stereo camera is deployed;
    determining depth information of each pixel on the ground image;
    establishing a three-dimensional point set based on the depth information of each pixel on the ground image, wherein the three-dimensional point set includes coordinate information of each three-dimensional point corresponding to each pixel of the ground image; and
    determining the height of the stereo camera based on the angle information and the three-dimensional point set, wherein determining the height of the stereo camera comprises:
        determining, based on the pitch angle and the tilt angle, a reference plane equation corresponding to a reference plane, wherein the reference plane is parallel to a horizon plane in a world coordinate system, and a center point of a lens of the stereo camera is within the reference plane;
        calculating distances between each three-dimensional point in the three-dimensional point set and the reference plane to obtain a distance set; and
        determining the height of the stereo camera based on the calculated distances in the distance set, and wherein the determining, based on the pitch angle and the tilt angle, a reference plane equation corresponding to a reference plane, comprises:
        determining the reference plane equation $ax+by+cz=0$ based on the pitch angle $\theta$ and the tilt angle $\varphi$, such that a point (a, b, c) in a camera coordinate system meets an angle conversion equation:

$$[y] = [T^{-1}][x]; \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, and $(x_r, y_r, z_r)$ is a point in the world coordinate system corresponding to the point $(x_c, y_c, z_c)$ in the camera coordinate system, wherein an origin of the world coordinate system coincides with an origin of the camera coordinate system, and coordinate axes of the world coordinate system are correspondingly parallel to coordinate axes of the world coordinate system.

2. The method according to claim 1, wherein the calculating distances between each three-dimensional point in the three-dimensional point set and the reference plane to obtain a distance set, comprises:
    calculating a distance $H_i$ between an $i^{th}$ three-dimensional point $(x_i, y_i, z_i)$ and the reference plane by using a first distance calculation equation based on the three-dimensional point set and the reference plane equation, wherein the distance set comprises the distance $H_i$, $1 \leq i \leq n$, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is $ax+by+cz=0$, a, b and c being coefficients of $ax+by+cz=0$.

3. The method according to claim 1, wherein the determining the height of the stereo camera based on the distances in the distance set, comprises:
    combining the distances in the distance set to obtain a target distance set, wherein distances in the target distance set are different from each other, each distance corresponds a number of times, and the number of times indicates a times count of occurrences of a corresponding distance in the distance set; and
    determining a distance corresponding a maximum number of times in the target distance set as the height of the stereo camera.

4. The method according to claim 1, wherein the reference plane equation is $ax+by+cz=0$, a, b and c being coefficients of $ax+by+cz=0$; and
    wherein the determining the height of the stereo camera based on the distances in the distance set, comprises:
        forming, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;

determining a middle point of width in the horizontal axis of a rectangular column having a maximum distance range in the distance histogram as a pre-selected height value H;

traversing, by a predefined step, each adjacent height value h around the pre-selected height value H to obtain a set of pre-selected plane, wherein each pre-selected plane in the set of pre-selected plane meets the equation ax+by+cz+d=0, d=−h; and each adjacent height value h meets h∈(h−σ, h+σ), σ being a predefined value, and σ being greater than or equal to the predefined step, and less than the predefined width;

calculating distances between each three-dimensional point and each pre-selected plane based on the three-dimensional point set and the set of pre-selected plane;

determining a three-dimensional point with the distance to the pre-selected plane being greater than a predefined support threshold as a support point of the pre-selected plane;

determining a pre-selected plane having the most support points in the pre-selected planes set as a target plane; and determining an average value of distances between each support point in the target plane and the reference plane as the height of the stereo camera.

5. The method according to claim 4, wherein the calculating distances between each three-dimensional point and each pre-selected plane based on the three-dimensional point set and the set of pre-selected plane, comprises:

calculating a distance $H_i'$ between the $i^{th}$ three-dimensional point $(x_i, y_i, z_i)$ and the first pre-selected plane by a second distance calculation equation based on the three-dimensional point set and the set of pre-selected plane, wherein $1 \leq i \leq n$, being the total number of three-dimensional points in the three-dimensional point set, and the second distance calculation equation being:

$$H_i' = \frac{|ax_i + by_i + cz_i + d|}{\sqrt{a^2 + b^2 + c^2}}$$

wherein the first pre-selected plane is a pre-selected plane in the set of pre-selected plane.

6. The method according to claim 1, wherein the ground image includes a plurality of contiguous ground images captured by the stereo camera; and wherein the determining depth information of each pixel on the ground image, comprises:

performing median filtering in time domain on the plurality of contiguous ground images to obtain a plurality of ground images after median filtering in time domain;

performing median filtering in space domain on the plurality of ground images after median filtering in time domain to obtain a plurality of ground images after median filtering in space domain; and determining depth information of each pixel on the ground images after median filtering in space domain.

7. A stereo camera, comprising:
at least one processing component; and
a memory;
wherein the memory stores at least one instruction, configured to be executed by the at least one processing component, and configured to be executed by the at least one processing component to perform the instructions:

acquiring angle information of a stereo camera, wherein the angle information includes a pitch angle and a tilt angle, capturing a ground image of a scenario where the stereo camera is deployed, determining depth information of each pixel on the ground image, establishing a three-dimensional point set based on depth information of each pixel on the ground image, wherein the three-dimensional point set includes coordinate information of each three-dimensional point corresponding to each pixel of the ground image; and determining the height of the stereo camera based on the angle information and the three-dimensional point set, wherein determining the height of the stereo camera comprises:

determining, based on the pitch angle and the tilt angle, a reference plane equation corresponding to a reference plane, wherein the reference plane is parallel to a horizon plane in a world coordinate system, and a center point of a lens of the stereo camera is within the reference plane;

calculating distances between each three-dimensional point in the three-dimensional point set and the reference plane to obtain a distance set; and determining the height of the stereo camera based on the calculated distances in the distance set, and wherein the determining, based on the pitch angle and the tilt angle, a reference plane equation corresponding to a reference plane, comprises:

determining the reference plane equation ax+by+cz=0 based on the pitch angle θ and the tilt angle φ, such that a point (a, b, c) in a camera coordinate system meets an angle conversion equation:

$$[y] = [T^{-1}][x]; \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, and $(x_\gamma, y_\gamma, z_\gamma)$ is a point in the world coordinate system corresponding to the point $(x_c, y_c, z_c)$ in the camera coordinate system, wherein an origin of the world coordinate system coincides with an origin of the camera coordinate system, and coordinate axes of the world coordinate system are correspondingly parallel to coordinate axes of the world coordinate system.

8. The stereo camera according to claim 7, wherein the calculating distances between each three-dimensional point in the three-dimensional point set and the reference plane to obtain a distance set, comprises:

calculating a distance $i^{th}$ between an $i^{th}$ three-dimensional point $(x_i, y_i, z_i)$ and the reference plane by using a first distance calculation equation based on the three-dimensional point set and the reference plane equation, wherein the distance set comprises the distance $H_i$, 1≤i≤n, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is ax+by+cz=0, a, b and c being coefficients of ax+by+cz=0.

9. The stereo camera according to claim 7, wherein the determining the height of the stereo camera based on the distances in the distance set, comprises:
   combining the distances in the distance set to obtain a target distance set, wherein distances in the target distance set are different from each other, each distance corresponds a number of times, and the number of times indicates a times count of occurrences of a corresponding distance in the distance set; and
   determining a distance corresponding a maximum number of times in the target distance set as the height of the stereo camera.

10. The stereo camera according to claim 7, wherein the reference plane equation is ax+by+cz=0, a, b and c being coefficients of ax+by+cz=0; and
   wherein the determining the height of the stereo camera based on the distances in the distance set, comprises:
   forming, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;
   determining a middle point of width in the horizontal axis of a rectangular column having a maximum distance range in the distance histogram as a pre-selected height value H;
   traversing, by a predefined step, each adjacent height value h around the pre-selected height value H to obtain a set of pre-selected plane, wherein each pre-selected plane in the set of pre-selected plane meets the equation ax+by+cz+d=0, d=−h; and each adjacent height value h meets h∈(h−σ, h+σ), σ being a predefined value, and σ being greater than or equal to the predefined step, and less than the predefined width;
   calculating distances between each three-dimensional point and each pre-selected plane based on the three-dimensional point set and the set of pre-selected plane;
   determining a three-dimensional point with the distance to the pre-selected plane being greater than a predefined support threshold as a support point of the pre-selected plane;
   determining a pre-selected plane having the most support points in the pre-selected planes set as a target plane; and
   determining an average value of distances between each support point in the target plane and the reference plane as the height of the stereo camera.

11. A height acquisition system, comprising:
   a remote control apparatus and a stereo camera; wherein the stereo camera is configured to:
      acquire angle information of the stereo camera, wherein the angle information includes a pitch angle and a tilt angle;
      capture a ground image of a scenario where the stereo camera is deployed; and
      send the angle information and the ground image to the remote control apparatus;
   the remote control apparatus is configured to:
      receive the angle information and the ground image;
      determine depth information of each pixel on the ground image;
      establish a three-dimensional point set based on depth information of each pixel on the ground image, wherein the three-dimensional point set includes coordinate information of each three-dimensional point corresponding to each pixel on the ground image; and
      determine the height of the stereo camera based on the angle information and the three-dimensional point set, wherein to determine the height of the stereo camera, the remote control apparatus is configured to:
         determine, based on the pitch angle and the tilt angle, a reference plane equation corresponding to a reference plane, wherein the reference plane is parallel to a horizon plane in a world coordinate system, and a center point of a lens of the stereo camera is within the reference plane;
         calculate distances between each three-dimensional point in the three-dimensional point set and the reference plane to obtain a distance set; and
         determine the height of the stereo camera based on the calculated distances in the distance set,
      wherein to determine, based on the pitch angle and the tilt angle, a reference plane equation corresponding to a reference plane, the remote control apparatus is configured to:
         determine the reference plane equation ax+by+cz=0 based on the pitch angle θ and the tilt angle φ, such that a point (a, b, c) in a camera coordinate system meets an angle conversion equation:

$$[y] = [T^{-1}][x]; \text{ wherein } [x] = \begin{bmatrix} x_r \\ y_r \\ z_r \end{bmatrix}, [y] = \begin{bmatrix} x_c \\ y_c \\ z_c \end{bmatrix},$$

$$[T] = \begin{bmatrix} \cos\varphi & \cos\theta\sin\varphi & -\sin\theta\sin\varphi \\ -\sin\varphi & \cos\theta\cos\varphi & -\sin\theta\cos\varphi \\ 0 & \sin\theta & \cos\theta \end{bmatrix},$$

$[T^{-1}]$ is an inverse of matrix $[T]$, $(x_c, y_c, z_c)$ is a point in the camera coordinate system, and $(x_r, y_r, z_r)$ is a point in the world coordinate system corresponding to the point $(x_c, y_c, z_c)$ in the camera coordinate system, wherein an origin of the world coordinate system coincides with an origin of the camera coordinate system, and coordinate axes of the world coordinate system are correspondingly parallel to coordinate axes of the world coordinate system.

12. The height acquisition system according to claim 11, wherein to calculate distances between each three-dimensional point in the three-dimensional point set and the reference plane to obtain a distance set, the remote apparatus is configured to:

calculate a distance $H_i$, between an $i^{th}$ three-dimensional point $(x_i, y_i, z_i)$ and the reference plane by using a first distance calculation equation based on the three-dimensional point set and the reference plane equation, wherein the distance set comprises the distance $H_i$, $1 \leq i \leq n$, n being the total number of three-dimensional points in the three-dimensional point set, and the first distance calculation equation is:

$$H_i = \frac{|ax_i + by_i + cz_i|}{\sqrt{a^2 + b^2 + c^2}};$$

wherein the reference plane equation is ax+by+cz=0, a, b and c being coefficients of ax+by+cz=0.

13. The height acquisition system according to claim 11, wherein to determine the height of the stereo camera based on the distances in the distance set, the remote apparatus is configured to:

combine the distances in the distance set to obtain a target distance set, wherein distances in the target distance set are different from each other, each distance corresponds a number of times, and the number of times indicates a times count of occurrences of a corresponding distance in the distance set; and determine a distance corresponding a maximum number of times in the target distance set as the height of the stereo camera.

14. The height acquisition system according to claim 11, wherein the reference plane equation is ax+by+cz=0, a, b and c being coefficients of ax+by+cz=0; and wherein to determine the height of the stereo camera based on the distances in the distance set, the remote apparatus is configured to:

form, by a predefined width as a class width, a distance histogram according the distance set, wherein herein a width in a horizontal axis of each rectangular column in the distance histogram indicates a distance range, and a length in a vertical axis of each rectangular column in the distance histogram indicates the number of distances within the distance range;

determine a middle point of width in the horizontal axis of a rectangular column having a maximum distance range in the distance histogram as a pre-selected height value H;

traverse, by a predefined step, each adjacent height value h around the pre-selected height value H to obtain a set of pre-selected plane, wherein each pre-selected plane in the set of pre-selected plane meets the equation ax+by+cz+d=0, d=−h; and each adjacent height value h meets h∈(h−σ, h+σ), σ being a predefined value, and σ being greater than or equal to the predefined step, and less than the predefined width;

calculate distances between each three-dimensional point and each pre-selected plane based on the three-dimensional point set and the set of pre-selected plane;

determine a three-dimensional point with the distance to the pre-selected plane being greater than a predefined support threshold as a support point of the pre-selected plane;

determine a pre-selected plane having the most support points in the pre-selected planes set as a target plane; and determine an average value of distances between each support point in the target plane and the reference plane as the height of the stereo camera.

* * * * *

UNITED STATES PATENT AND TRADEMARK OFFICE
CERTIFICATE OF CORRECTION

PATENT NO. : 11,024,052 B2
APPLICATION NO. : 16/548721
DATED : June 1, 2021
INVENTOR(S) : Di Zhang et al.

Page 1 of 1

It is certified that error appears in the above-identified patent and that said Letters Patent is hereby corrected as shown below:

In the Specification

In Column 3, Line 39, (Approx.), delete "$H_i$" and insert --$H'_i$--.

In Column 4, Line 59, (Approx.), delete "$1 \leq i \cdot n$," and insert --$1 \leq i \leq n$,--.

In Column 5, Line 64, (Approx.), delete "$(H'_i)_i$" and insert --$H'_i$--.

In Column 16, Line 32, (Approx.), delete "y" and insert --[y]--.

In Column 17, Line 34, delete "3503" and insert --3053--.

In Column 22, Line 33, delete "$(x_i, y_i, z)$" and insert --$(x_i, y_i, z_i)$--.

In Column 23, Line 36, (Approx.), delete "a the" and insert --a--.

In the Claims

In Column 29, Claim 5, Line 41, delete "being" and insert --n being--.

In Column 31, Claim 8, Line 1, delete "$i^{th}$" and insert --$H_i$--.

In Column 33, Claim 12, Line 4, delete "$H_i$," and insert --$H_i$--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*